United States Patent
Norhammar et al.

(10) Patent No.: US 10,123,085 B2
(45) Date of Patent: Nov. 6, 2018

(54) SYNCHRONISED SOCIAL TV

(71) Applicant: TELEFONAKTIEBOLAGET LM ERICSSON (PUBL), Stockholm (SE)

(72) Inventors: Björn Norhammar, Stocksund (SE); Fredrik Lindholm, Tokyo (JP)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 49 days.

(21) Appl. No.: 15/304,034

(22) PCT Filed: Apr. 15, 2014

(86) PCT No.: PCT/EP2014/057604
§ 371 (c)(1),
(2) Date: Oct. 13, 2016

(87) PCT Pub. No.: WO2015/158368
PCT Pub. Date: Oct. 22, 2015

(65) Prior Publication Data
US 2017/0214972 A1    Jul. 27, 2017

(51) Int. Cl.
| | |
|---|---|
| *H04N 21/4788* | (2011.01) |
| *H04N 21/242* | (2011.01) |
| *H04N 21/43* | (2011.01) |
| *H04L 29/06* | (2006.01) |
| *H04N 21/472* | (2011.01) |
| *H04N 21/643* | (2011.01) |

(52) U.S. Cl.
CPC ..... *H04N 21/4788* (2013.01); *H04L 65/1006* (2013.01); *H04N 21/242* (2013.01); *H04N 21/4302* (2013.01); *H04N 21/47202* (2013.01); *H04N 21/64322* (2013.01)

(58) Field of Classification Search
CPC ............. H04N 21/4788; H04N 21/242; H04N 21/4302; H04N 21/47202; H04N 21/64322
See application file for complete search history.

(56) References Cited

U.S. PATENT DOCUMENTS

| | | | | |
|---|---|---|---|---|
| 7,996,566 | B1* | 8/2011 | Sylvain | H04N 7/15 709/202 |
| 9,014,535 | B2* | 4/2015 | Klappert | G06Q 50/01 386/201 |
| 2006/0031914 | A1* | 2/2006 | Dakss | H04H 60/13 725/135 |
| 2006/0236352 | A1* | 10/2006 | Scott, III | H04N 5/76 725/89 |
| 2007/0271338 | A1* | 11/2007 | Anschutz | G06Q 10/10 709/204 |

(Continued)

FOREIGN PATENT DOCUMENTS

| | | |
|---|---|---|
| EP | 2328349 A1 | 6/2011 |
| EP | 2547065 A1 | 1/2013 |
| WO | 2007/101473 A1 | 9/2017 |

*Primary Examiner* — Alexander Q Huerta

(57) ABSTRACT

A method of synchronizing streaming media between a plurality of UEs connected to a communications network, wherein the UEs are involved in a SIP-enabled voice session over said communications network. A timestamp is provided to each of the UEs. Each of the UEs then sends a request for streamed media to an IPTV service, receives streamed media from the IPTV service, and commences playout of the streamed media in dependence upon the timestamp.

9 Claims, 7 Drawing Sheets

(56) References Cited

U.S. PATENT DOCUMENTS

| | | | |
|---|---|---|---|
| 2008/0137690 A1* | 6/2008 | Krantz | H04Q 3/0025 370/503 |
| 2009/0205008 A1* | 8/2009 | Wollmershauser | H04N 21/242 725/131 |
| 2009/0222520 A1* | 9/2009 | Sloo | H04N 7/17318 709/205 |
| 2009/0233542 A1* | 9/2009 | Gratton | H04H 60/80 455/3.06 |
| 2010/0083324 A1* | 4/2010 | Smith | H04N 7/17318 725/109 |
| 2010/0257280 A1* | 10/2010 | Stokking | H04L 65/80 709/231 |
| 2011/0016172 A1* | 1/2011 | Shah | G06F 17/30026 709/203 |
| 2011/0066864 A1* | 3/2011 | Tysowski | H04M 1/7253 713/193 |
| 2011/0154417 A1* | 6/2011 | Civanlar | H04N 7/15 725/105 |
| 2012/0047276 A1* | 2/2012 | Lindquist | H04L 65/1016 709/228 |
| 2012/0324520 A1* | 12/2012 | Van Deventer | H04L 65/605 725/109 |
| 2013/0016955 A1* | 1/2013 | Pejaver | H04L 65/4084 386/248 |
| 2013/0041954 A1* | 2/2013 | Kim | H04L 65/1069 709/204 |
| 2013/0061280 A1* | 3/2013 | Bartnik | H04N 21/4307 725/148 |
| 2013/0067116 A1* | 3/2013 | Ostergren | H04L 65/4069 709/248 |
| 2013/0076980 A1* | 3/2013 | Oren | H04N 5/04 348/500 |
| 2013/0173742 A1* | 7/2013 | Thomas | H04L 65/4076 709/217 |
| 2015/0281289 A1* | 10/2015 | Lotfallah | H04L 65/1016 709/219 |
| 2016/0044622 A1* | 2/2016 | Crowe | H04L 65/60 709/231 |

\* cited by examiner

SYNCHRONISED SOCIAL TV

This application is a 371 of International Application No. PCT/EP2014/057604, filed Apr. 15, 2014, the disclosure of which is fully incorporated herein by reference.

FIELD OF THE INVENTION

The invention relates to the fields of video on demand services and communications. More particularly, the invention relates to synchronising IPTV streams for participants in a voice session.

BACKGROUND

Social TV has been increasing in popularity over the last few years. Social TV is the combination of television and social media, with people communicating with each other over communications networks while watching a TV show or video on demand (VoD) stream. Social TV allows users to have the experience of chatting to a friend while watching TV without the need to be in the same physical location.

Many new "smart TVs" now include communications (e.g. VOIP) clients in their TV sets, and other devices such as video game consoles and media centres support communications services in parallel with video streaming. Currently, there is little integration between the communications services and the video stream—the two applications run separately, sharing space on the screen, but with no interaction between the services. For example, a user of the Xbox One™ video games console can watch a video stream while engaging in a video call with another user via Skype™ but there is no mechanism for ensuring that the video stream is synchronised for both users. This leads to undesirable situations such as hearing a friend's reaction to a goal in a football game before seeing the goal being scored. It also requires careful timing if you wish to watch content delivered by unicast streams with a friend, especially since differing download rates may cause your device to take longer to buffer the content than your friend's device. These problems are made worse when attempting to coordinate more than two people for a social TV experience.

Previous attempts have been made to coordinate voice services and VoD services, for example "Network implemented PVR and chase-play combined with IMS services"—WO2007/101473, but these have been focussed on use cases where only a single user is watching the VoD stream, or focussed on closer integration of IPTV services within the network used for voice calling (e.g. IMS integration of IPTV services).

SUMMARY

According to a first aspect of the invention, there is provided a method of synchronising streaming media between a plurality of UEs connected to a communications network, wherein the UEs are involved in a SIP-enabled voice session over said communications network. A timestamp is provided to each of the UEs. Each of the UEs then sends a request for streamed media to an IPTV service, receives streamed media from the IPTV service, and commences playout of the streamed media in dependence upon the timestamp.

According to a second aspect of the invention, there is provided a method in a first UE of synchronising streaming media between the first UE and one or more further UEs connected to a communications network, wherein the first UE and the one or more UEs are involved in a SIP-enabled voice session over said communications network. The first UE receives a SIP message associated with the voice session and containing a play media command, the play media command comprising a timestamp. The first UE sends a request for streamed media to an IPTV service, and receives streamed media from the IPTV service either before or after receiving the play media command. Following receipt of the play media command, the first UE commences playout of the streamed media in dependence upon the timestamp of the play media command.

According to a third aspect of the invention, there is provided a method in an application server of synchronising streaming media between a first UE and one or more further UEs connected to a communications network. The application server is also connected to the communications network and the application server handles a SIP-enabled voice session over the communications network. The application server receives a SIP message associated with the voice session and containing a synchronisation request from the first UE via a control channel of the voice session. The application server then sends a SIP message associated with the voice session and containing a play media command to each of the one or more further UEs via the control channel of the voice session, the play media command comprising a timestamp.

According to a fourth aspect of the invention, there is provided a method in a first UE of synchronising streaming media between the first UE and one or more further UEs connected to a communications network, wherein the first UE and the one or more further UEs are involved in a SIP-enabled voice session over said communications network. The first UE sends a SIP message associated with the voice session and containing a play media command to an application server or each of the one or more further UEs via a control channel of the voice session, the play media command comprising a timestamp. The first UE sends a request for streamed media to an IPTV service and receives streamed media from the IPTV service either before or after sending the play media command. The first UE commences playout of the streamed media in dependence upon the timestamp of the play media command.

According to a fifth aspect of the present invention, there is provided an apparatus configured to operate as a UE in a SIP-enabled communications network. The apparatus comprises a first transceiver, a second transceiver and a processor. The first transceiver is configured to send and receive signalling from other entities in the communications network. The second transceiver is configured to send and receive signalling from an IPTV service. The processor is configured to:

- receive, via the first transceiver, a SIP message associated with a voice session involving the UE and one or more further UEs, the SIP message containing a play media command comprising a timestamp;
- cause the second transceiver to send a request for streamed media to the IPTV service;
- receive, via the second transceiver, streamed media from the IPTV service; and
- commence playout of the streamed media in dependence upon the timestamp of the play media command.

According to a sixth aspect of the present invention, there is provided an apparatus configured to operate as an application server in a communications network. The apparatus comprises a transceiver configured to send and receive signalling from other entities in the communications network. The transceiver is further configured to receive a SIP message associated with a voice session involving a first UE and one or more further UEs, the SIP message containing a synchronisation request from the first UE; and send a SIP message associated with the voice session and containing a play media command to each of the one or more further UEs, the play media command comprising a timestamp.

According to a seventh aspect of the invention, there is provided an apparatus configured to operate as a UE in a communications network. The apparatus comprises a first transceiver, a second transceiver and a processor. The first transceiver is configured to send and receive signalling from other entities in the communications network. The second transceiver is configured to send and receive signalling from an IPTV service. The processor is configured to:
  send, via the first transceiver a SIP message associated with a voice session involving the UE and one or more further UEs, the SIP message containing a play media command to an application server or to each of the one or more further UEs, the play media command comprising a timestamp;
  send a request for streamed media to an IPTV service via the second transceiver;
  receive streamed media from the IPTV service via the second transceiver;
  commence playout of the streamed media in dependence upon the timestamp of the play media command.

According to an eighth aspect of the invention, there is provided a computer program, comprising instructions which, when executed on at least one processor, cause the at least one processor to carry out the method of any of the above aspects. The computer program may be contained in a carrier such as an electronic signal, optical signal, radio signal, or a non-transitory computer readable storage medium.

DETAILED DESCRIPTION

Figure 1:
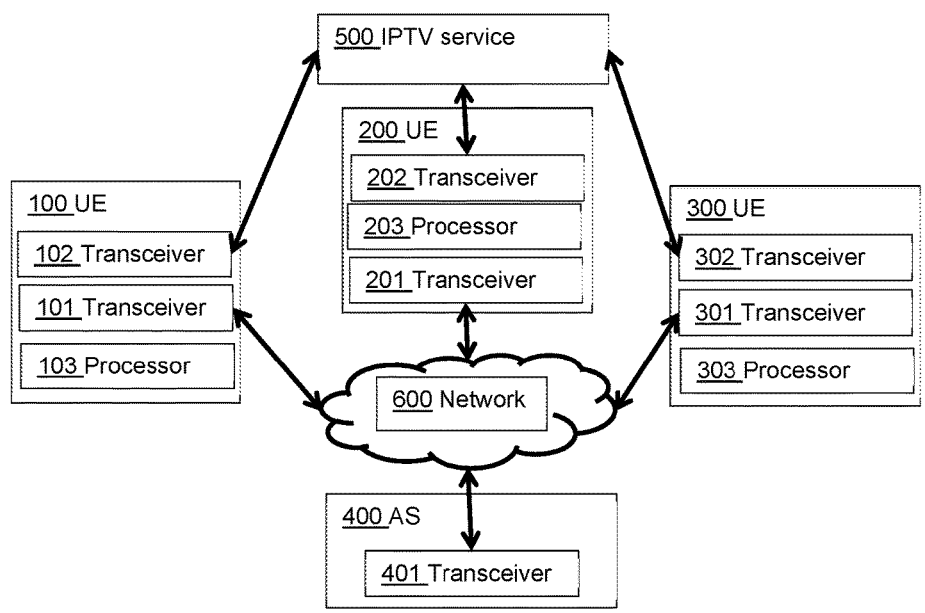
FIG. 1 is a schematic diagram of a communications network and IPTV service.

A method will now be described for providing a synchronised social TV experience to users engaged in a voice or video call. The description below relies on the setup shown in FIG. 1. Each user has a UE 100/200/300, which contains a first transceiver 101/201/301 for communicating with a communications network 600, a second transceiver 102/202/302 for communicating with an IPTV service 500, and a processor 103/203/303 configured to implement the methods described below. In some of the below embodiments, there is also an application server (AS) 400 which handles social TV synchronisation connected to the network 600.

The AS 400 comprises a transceiver 401 for communicating with the UEs. For simplicity, only three UEs are shown, but the method described below may be extended to more or fewer UEs.

As a prerequisite for the methods described below, it is assumed that the UEs are already engaged in a voice or video session over the network 600, and that there is an available control channel for that session. The voice or video session may be, for example, a VOIP session, an MMTel conference call, or a videoconferencing session. It is also assumed that the users have agreed on what to watch, and that they all have access to the content on the IPTV server. In the case of a conference call, the AS 400 may also be the AS which handles the conference call (e.g. an MMTel conference AS).

The basic premise of the invention is to provide each of the UEs with a timestamp for use in synchronising the playout of the media stream. For example, the timestamp may represent a time at which a specified portion of the media stream should be played (e.g. the time at which the start of the media stream should be played). If the UE commences playout of the media stream after the timestamp, then playout is initiated at a point such that the content being played is the same as if the specified portion of the media stream had been played at the timestamp. For example, if the UE initiates playout 10 seconds after the timestamp, the UE will seek to a point in the media stream 10 seconds after the specified portion. In this way, playout of the media stream is synchronised between all of the UEs.

Figure 2:
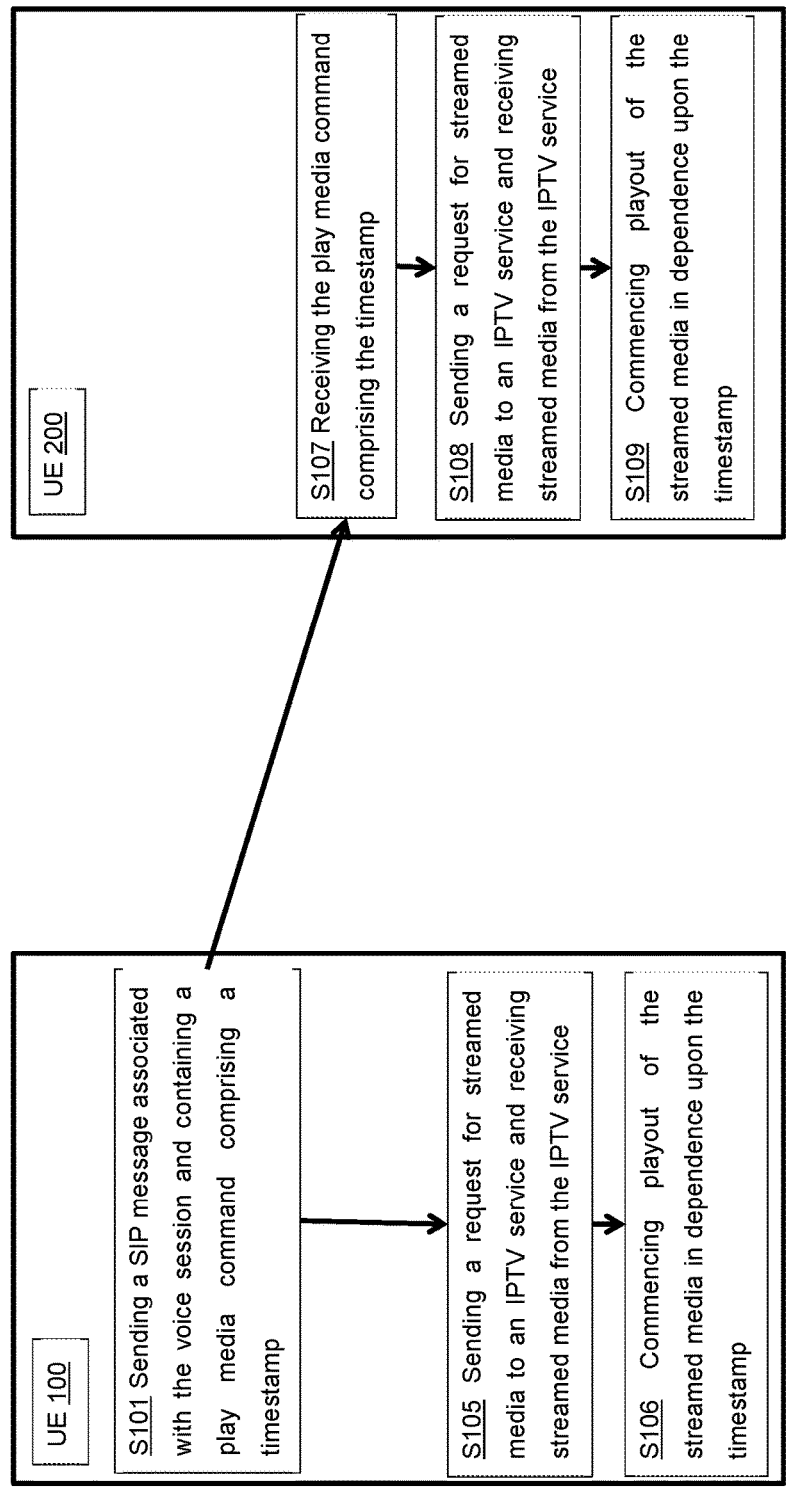
FIG. 2 is a flowchart of a method according to on embodiment.

FIG. 2 shows a flowchart of a method according to one embodiment, where the AS 400 is not involved. The UE 100 sends a play media command to the UEs 200 and 300 (S101). The play media command comprises a timestamp, and may further comprise an identification of the media to be streamed and/or an offset corresponding to a specified portion of the media. The UE 200 receives the play media command (S107). Each of the UEs 100, 200 and 300 then sends a request for streamed media to the IPTV service, and receives the streamed media from the IPTV service (S105, S108). Each UE then commences playout of the streamed media in dependence upon the timestamp (S106, S109), e.g. as described previously.

Figure 3:
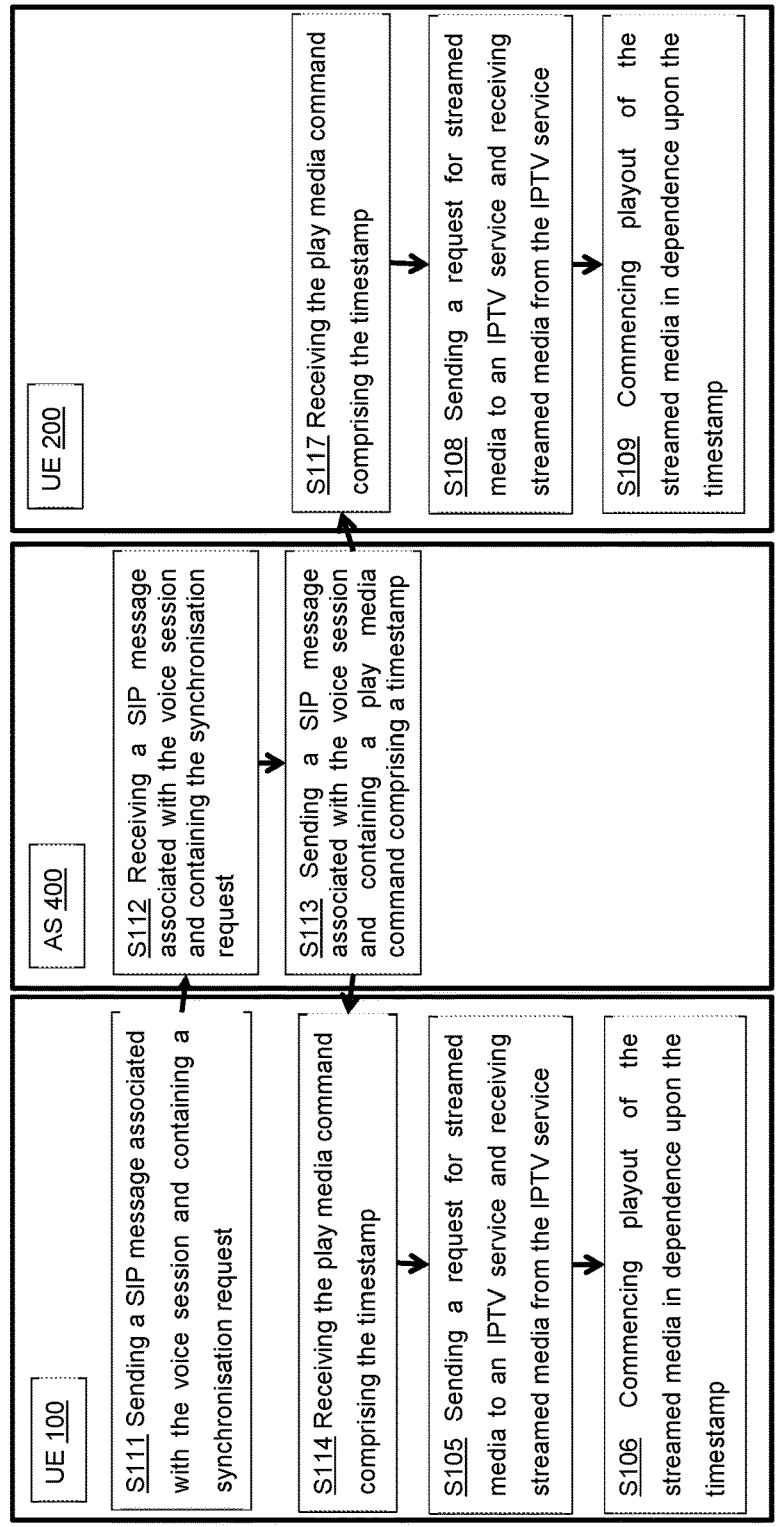
FIG. 3 is a flowchart of a method according to a further embodiment.

As an alternative, the synchronisation may be handled by an AS 400. In this case, either the AS 400 or the UE 100 may generate the timestamp used for synchronisation. The case where the AS 400 generates the timestamp is shown in FIG. 3. The UE 100 sends a synchronisation request to the AS 400 (S111, S112). The AS then sends a play media command comprising a timestamp to all UEs in the voice session (e.g. UEs 100 200 and 300) over a control channel of the voice session (S113). Each UE receives the play media command (S114, S117), sends a request for streamed media to the IPTV service and receives the streamed media (S105, S108). Each UE then commences playout of the streamed media in dependence upon the timestamp (S106, S109) e.g. as described previously.

Figure 4:
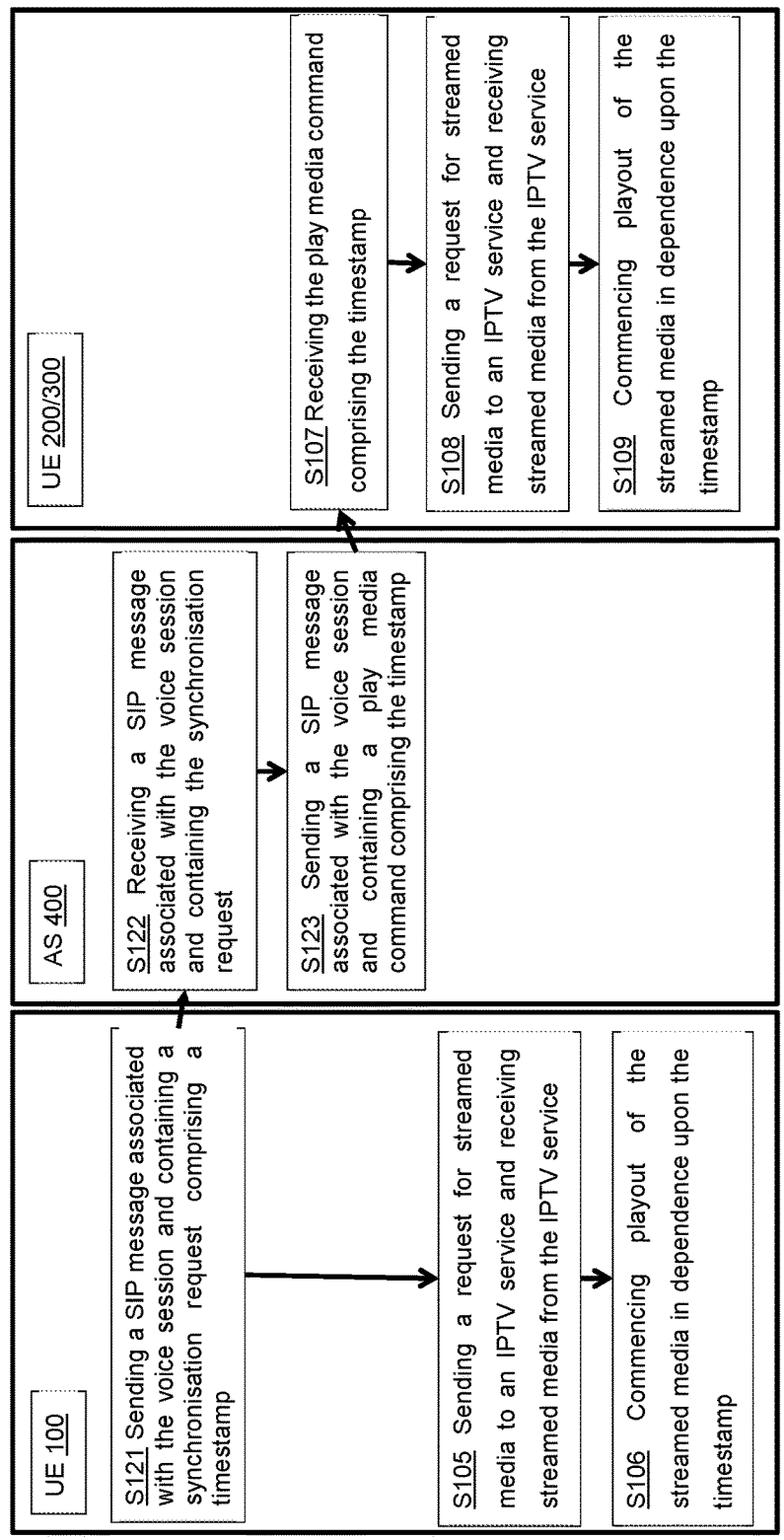
FIG. 4 is a flowchart of a method according to a further embodiment.

The case where the UE 100 generates the timestamp is shown in FIG. 4. The UE 100 sends a synchronisation request comprising a timestamp to the AS 400 (S121, S122). The AS then sends a play media command comprising the timestamp to all the other UEs in the voice session (e.g. UEs 200 and 300) over a control channel of the voice session (S123). Each other UE receives the play media command (S117), and the UE 100 and each other UE send a request for streamed media to the IPTV service and receive the streamed media (S105, S108). Each UE then commences playout of the streamed media in dependence upon the timestamp (S106, S109) e.g. as described previously.

In each case, the signalling from UE to UE or UE to AS is performed via control signalling of the voice session, e.g. by SIP messages associated with the voice session.

Figure 5:
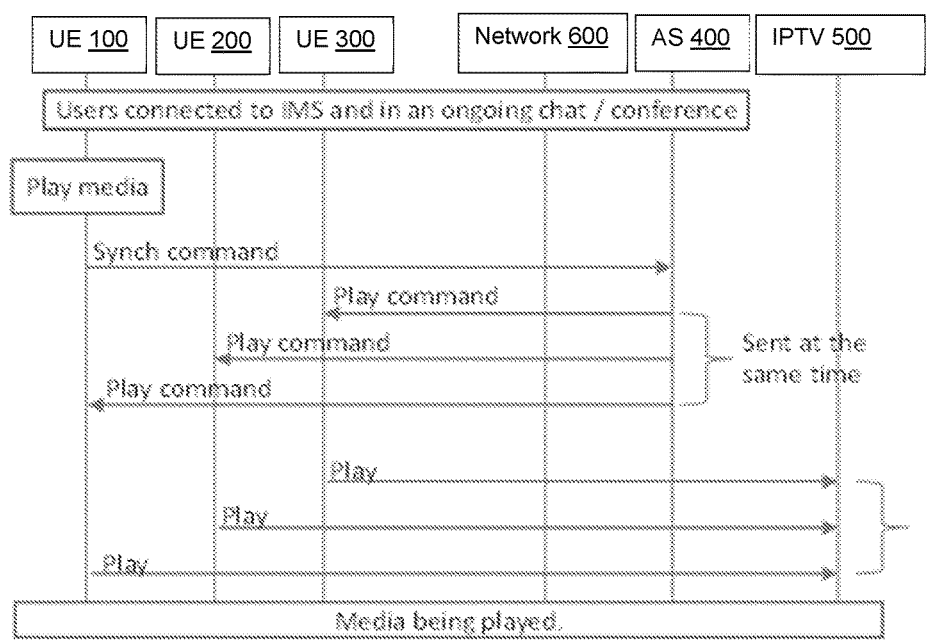
FIG. 5 shows the signalling according to a further embodiment.

A signalling diagram of the embodiments including the AS 400 is shown in FIG. 5. The play media commands may be sent approximately simultaneously by the AS 400, to ensure that all the UEs begin playout as close to the same time as possible (as well as the content being synchronised).

Figure 6:
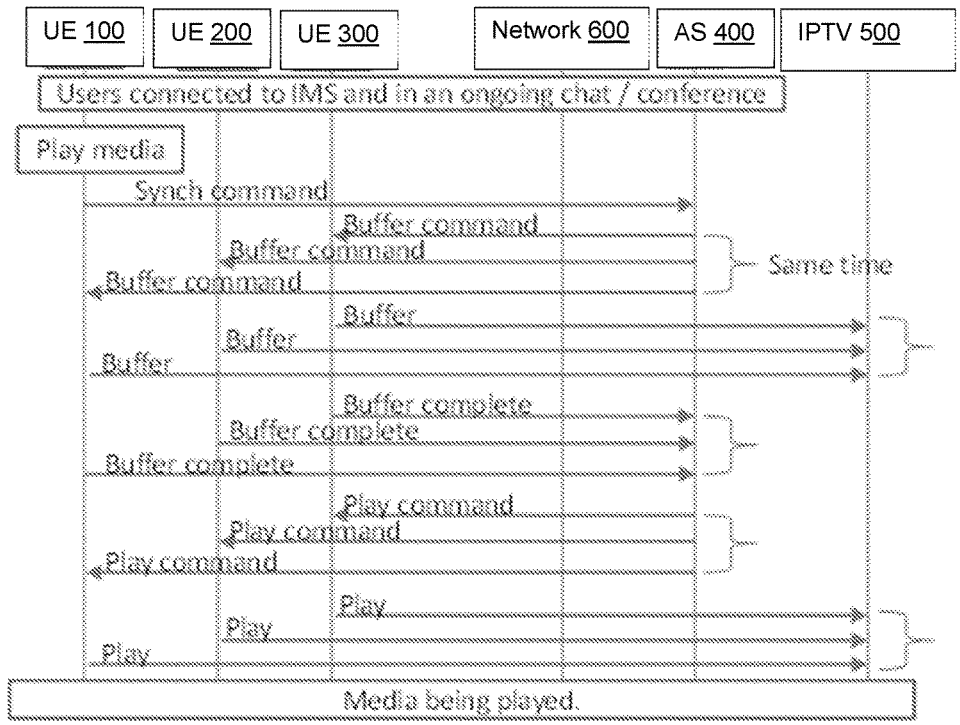
FIG. 6 shows the signalling according to a further embodiment.

FIG. 6 shows a signalling diagram for a possible improvement. After receiving the synchronisation request, the AS 400 sends a buffer media command to each UE. Alternatively, in embodiments which do not involve the AS 400, the buffer media command may be sent by the UE 100 prior to sending the play media command. Each of the UEs then buffers the streamed media from the IPTV service, and once enough of the media has been buffered, sends a buffering complete notification to the AS 400 (or the UE 100), which then sends a play media command comprising a timestamp, as before. This avoids the potential situation where a user with a slow internet connection may miss a portion of the start of the media stream as their UE is unable to buffer enough media to begin playout when the timestamp occurs.

Figure 7:
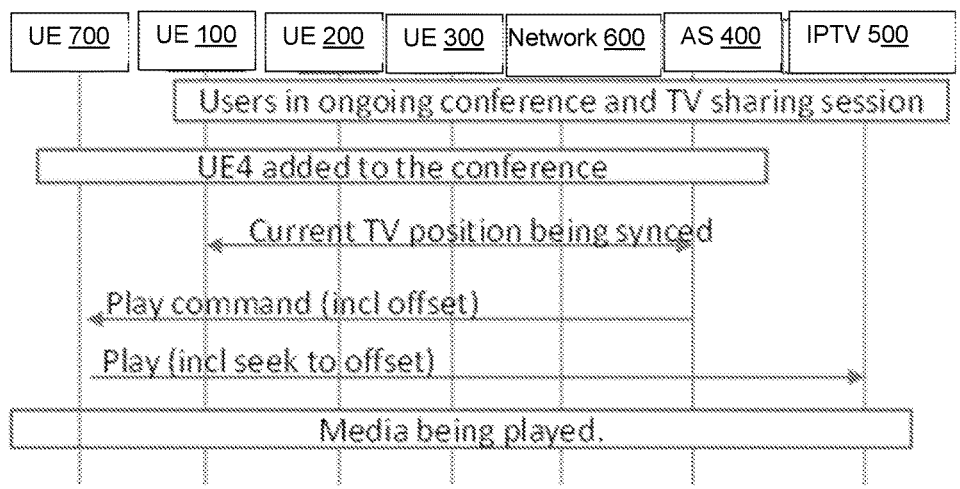
FIG. 7 shows the signalling according to a further embodiment.

FIG. 7 shown a signalling diagram for a method of adding a participant to an ongoing social TV session. UEs 100, 200 and 300 are involved in an ongoing conference voice call and TV sharing session, with the current position in the media stream being synchronised by the AS 400 (or the UE 100 in embodiments not involving the AS). The UE 700 is added to the conference. The AS 400 (or UE 100) sends a play media command to the UE 700, the play media command comprising a timestamp and an offset. The timestamp and offset are chosen such that the synchronised media stream would reach or has reached the offset at the time indicated by the timestamp, e.g. a timestamp of 18:44:42.12 and offset of 160.62s would indicate that each of the UEs 100, 200 and 300 was (or would be expected to be) 160.62s from the start of the media stream at 18:44:42.12. The UE 700 plays the streamed media from the IPTV service after seeking to an offset such that the media stream will reach or would have reached the offset at the time indicated by the timestamp.

Figure 8:
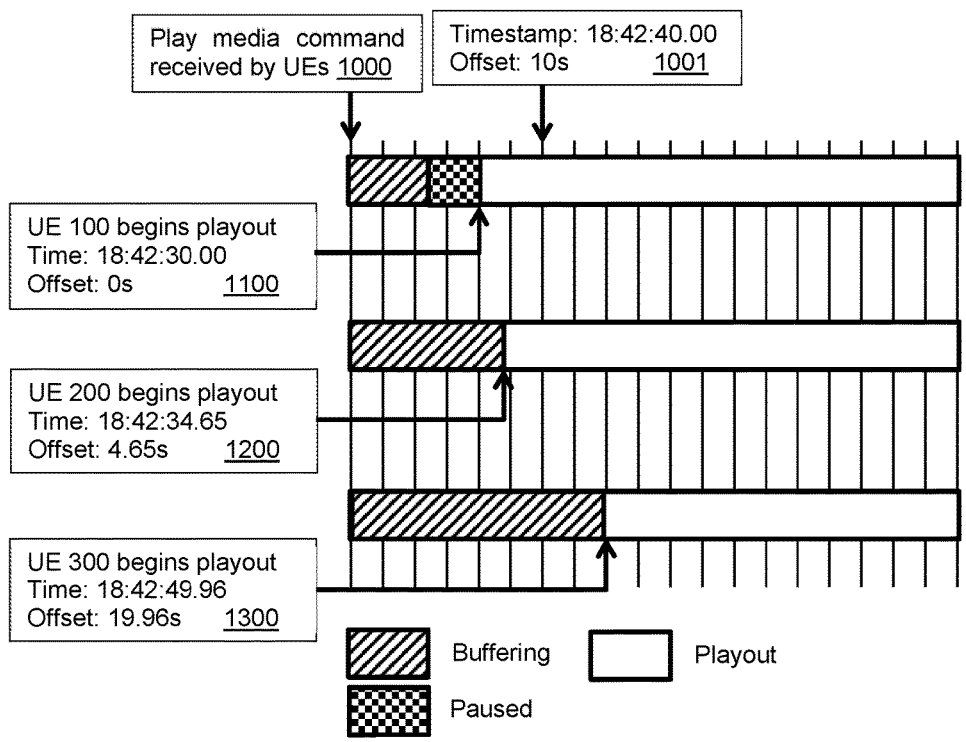
FIG. 8 illustrates synchronization according to a further embodiment.

FIG. 8 illustrates how a timestamp and an offset may be used to synchronise the media streams. The play media command 1000 is received by each of the UEs 100, 200 and 300, and comprises a timestamp and an offset 1001. Alternatively, the play media command may only comprise the timestamp, and the offset may be predefined (e.g. always the start of the media). Each UE begins to buffer the media stream content (slanted lines). The UE 100 finishes buffering at such a time that in order to play the media so that the offset specified in the play media command occurs at the time represented by the timestamp, the UE 100 would need to start playout before the start of the media. Therefore, the UE 100 pauses the media stream until a time where it is possible to play the media such that the offset specified in the play media command occurs at the time represented by the timestamp 1100. In this case, the UE 100 subtracts the specified offset from the timestamp to obtain a start time, and begins playout at an offset of zero at the start time.

The UE 200 finishes buffering the media stream before the time represented by the timestamp of the play media command, but at a time where it is possible to start playout of the media such that the offset specified in the play media command occurs at the time represented by the timestamp. The UE 200 compares the current time to the timestamp, and determines the difference. The UE 200 then begins playout at an offset equal to the offset specified in the play media command minus the difference between the current time and the timestamp.

The UE 300 finishes buffering the media stream after the time represented by the timestamp of the play media command. The UE 300 compares the current time to the timestamp, and determines the difference. The UE 300 then begins playout at an offset equal to the offset specified in the play media command plus the difference between the current time and the timestamp.

In this way, all three UEs are playing the media stream in a synchronised fashion. Alternative methods may be used to synchronise the media streams from the timestamp, e.g. the timestamp may correspond to the start of the media stream (and therefore only the cases of UE 100 and UE 300 above are possible).

If the users wish to seek (e.g. "fast forward" or "rewind") to other locations in the media stream during playout, or pause the playout, the synchronisation process will need to be repeated to ensure that the streams are still synchronised after the seek is complete or once playout resumes. The UE performing the seek operation would record a timestamp and offset corresponding to the state of the media stream after the sync (or the expected state), and send a synchronisation command as previously depicted In the case where the network 600 is an IMS network, the AS 400 may be an IMS application server. The "play media command" and "synchronisation request" may be implemented as SIP requests, e.g. SIP MESSAGE. The buffer media command may also be implemented as a SIP request, with the buffering complete notification being implemented as either a further SIP request, or a SIP response (e.g. 200 OK or another suitable response code). The communication with the IPTV service may be implemented over the IMS or, alternatively, it may be via a different network route. Where the voice or video call is a conference call, the AS 400 may be an MMTel conference call AS. Alternatively, the messages described above may be implemented as media messages within a conference service (e.g. sent over Realtime Transfer Protocol, RTP, or Message Session Relay Protocol, MSRP). In this case, the AS may implement a Media Resource Function (MRF) including media proxy functionality. The MRF is configured to distribute requests to the UEs based on incoming requests from one of the UEs.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A method of synchronising streaming media between a plurality of user equipment (UEs) connected to a communications network, wherein the UEs are involved in a session initiation protocol (SIP) enabled voice session over said communications network, the method comprising:

simultaneously providing, to each of the UEs in the SIP enabled voice session, a play media command comprising a timestamp over a control channel of the SIP enabled voice session, wherein each of the UEs comprises a first transceiver that enables the SIP enabled voice session over said communications network and further enables receipt of the play media command;

upon receiving the play media command, each of the UEs having their respective first transceivers involved in the SIP enabled voice session further comprise a second transceiver and a processor that perform the following:

sending a request for streamed media to an Internet protocol television (IPTV) service;

receiving streamed media from the IPTV service; and, commencing playout of the streamed media in dependence upon the timestamp.

2. The method according to claim 1, wherein, for at least one of the UEs, the steps of sending a request for streamed media to the IPTV service and receiving streamed media from the IPTV service occur prior to the step of providing a timestamp to the UEs.

3. The method according to claim 1, wherein the step of commencing playout of the streamed media in dependence upon the timestamp comprises:

determining a first offset for the media such that initiating playout of the media from the first offset at a specified time will cause the timestamp to correspond to a second offset of the media;

sending a seek command specifying the first offset to the IPTV service;

at the specified time, initiating playout of the media from the first offset.

4. The method according to claim 3, wherein the second offset of the media corresponds to the start of the media.

5. The method according to claim 3, wherein the method further comprising providing a value of the second offset of the media to each of the UEs.

6. A method in an application server of synchronising streaming media between a first user equipment (UE) and one or more further UEs connected to a communications network, wherein the application server is also connected to the communications network and the application server handles a session initiation protocol (SIP) enabled voice session for the first UE and the one or more further UEs over the communications network, the method comprising:

receiving, by a transceiver of the application server, a SIP message associated with the SIP enabled voice session and containing a synchronisation request from the first UE via a control channel of the voice session; and, simultaneously sending, by the transceiver of the application server, a play media command comprising a timestamp to the first UE and the one or more further UEs involved in the SIP enabled voice session over a control channel of the SIP enabled voice session.

7. The method according to claim 6, wherein the synchronisation request comprises the timestamp.

8. The method according to claim 6, and comprising, prior to sending the play media commands:

sending a buffer media command to each of the first UE and the one or more further UEs via the control channel of the SIP enabled voice session; and, receiving a buffering complete notification from each of the first UE and the one or more further UEs via the control channel of the SIP enabled voice session.

9. The method according to claim 6, further comprising:

adding another UE to the ongoing SIP enabled voice session;

sending the another UE a play media command comprising a timestamp and an offset, wherein the timestamp and the offset are chosen such that the synchronized media stream would reach or has reached the offset at the time indicated by the timestamp.

* * * * *